(12) United States Patent
You et al.

(10) Patent No.: US 10,777,794 B2
(45) Date of Patent: Sep. 15, 2020

(54) BATTERY PACK

(71) Applicant: CONTEMPORARY AMPEREX TECHNOLOGY CO., LIMITED, Ningde, Fujian (CN)

(72) Inventors: Kaijie You, Ningde (CN); Haizu Jin, Ningde (CN); Dongyang Shi, Ningde (CN); Fei Hu, Ningde (CN); Yu Tang, Ningde (CN); Yuepan Hou, Ningde (CN); Ziyuan Li, Ningde (CN); Jun Ma, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 16/394,145

(22) Filed: Apr. 25, 2019

(65) Prior Publication Data
US 2020/0212398 A1    Jul. 2, 2020

(30) Foreign Application Priority Data

Dec. 30, 2018 (CN) .......................... 2018 1 1648932

(51) Int. Cl.
*H01M 2/12* (2006.01)
*H01M 2/10* (2006.01)

(52) U.S. Cl.
CPC .......... *H01M 2/127* (2013.01); *H01M 2/1077* (2013.01); *H01M 2200/00* (2013.01); *H01M 2220/20* (2013.01)

(58) Field of Classification Search
CPC .............................. H01M 2/127; H01M 2/1077
See application file for complete search history.

(56) References Cited

U.S. PATENT DOCUMENTS

2012/0276423 A1    11/2012  Asakura et al.
2015/0044530 A1*    2/2015  Koch .................. H01M 2/1252
                                                       429/82

(Continued)

FOREIGN PATENT DOCUMENTS

| JP | 2012119138 A | 6/2012 |
| JP | 2012204193 A | 10/2012 |
| WO | 2018108371 A1 | 6/2018 |

OTHER PUBLICATIONS

Extended European Search Report for European Patent Application No. 19170777.7 dated Jun. 19, 2019.

*Primary Examiner* — Stewart A Fraser
(74) *Attorney, Agent, or Firm* — Heslin Rothenberg Farley & Mesiti P.C.

(57) ABSTRACT

The present application discloses a battery pack, comprising a first battery module, a second battery module, a housing and a fireproof member. The first battery module includes a plurality of battery cells which are provided with vents; the second battery module includes a plurality of battery cells which are provided with vents. Both the first battery module and the second battery module are arranged in the housing; the fireproof member is vertically disposed and located between the vents of the first battery module, where the vents of the first battery module and the vents of the second battery module both face the fireproof member. The battery pack prevents collective thermal runaway of the battery cells by using the fireproof member to separate the battery cells of the first battery modules and the battery cells of the second battery modules.

13 Claims, 8 Drawing Sheets

(56) References Cited

U.S. PATENT DOCUMENTS

2017/0214018 A1* 7/2017 Sun .................. H01M 2/127
2017/0373287 A1* 12/2017 Yamashita .......... H01M 2/1005
2019/0319231 A1* 10/2019 Nguyen ............. H01M 2/206

* cited by examiner

BATTERY PACK

CROSS-REFERENCE TO RELATED APPLICATION

This application claims the priority benefit of Chinese Patent Application Serial No. 201811648932.1 filed on Dec. 30, 2018 and entitled "BATTERY PACK", the disclosure of which is incorporated by reference herein in its entirety.

TECHNICAL FIELD

The present disclosure relates to an energy storage component, particularly to a battery pack.

BACKGROUND

In recent years, with energy density of battery cells becoming higher, it is increasingly urgent for electric vehicles to improve safety of batteries, and thermal runaway is a key issue in safety research on battery cells. As a power source for an electric vehicle, a battery pack is generally disposed in a chassis of the electric vehicle. A battery pack includes a plurality of battery modules, and each battery module has a plurality of battery cells arranged in rows and a plurality of bus bars electrically connected to the plurality of battery cells. In the existing technologies, a vent of a battery cell faces upward, that is, the vent directly faces a passenger above the battery pack. As a result, thermal runaway would directly threaten a passenger's safety due to upward energy release and flames by the battery cell.

SUMMARY

In one embodiment of the present disclosure, it is provided a battery pack, including:
a first battery module, including a plurality of battery cells, wherein each of the plurality of battery cells of the first battery module is provided with vents;
a second battery module, including a plurality of battery cells, wherein each of the plurality of battery cells of the second battery module is provided with vents;
a housing, for housing both the first battery module and the second battery module; and
a fireproof member, vertically disposed and located between the vent of the first battery module and the vent of the second battery module, wherein the vents of the first battery module and the vents of the second battery module face the fireproof member.

In an embodiment of the present disclosure, the plurality of battery cells of the first battery module are arranged in a vertical direction and/or a horizontal direction, and the plurality of battery cells of the second battery module are arranged in a vertical direction and/or a horizontal direction.

In an embodiment of the present disclosure, the fireproof member extends along an arrangement direction of the battery cells, and covers the vents of all of the battery cells in the first battery module and the vents of the battery cells in the second battery module.

In an embodiment of the present disclosure, the fireproof member includes a fireproof member body and a first extension connected to an upper end of the fireproof member body, and the first extension extends in a direction towards the first battery module; and/or,
The fireproof member includes a fireproof member body and a second extension connected to a lower end of the fireproof member, and the second extension extends in a direction towards the first battery module.

In an embodiment of the present disclosure, the first battery module further includes two first end plates, and the two first end plates are respectively located at two ends of the first battery module having the plurality of battery cells in a horizontal direction, and the first extension and/or second extension of the fireproof member is fixed to the first end plates.

In an embodiment of the present disclosure, a top surface of the first end plate is provided with a fixing protrusion extending in the vertical direction, and the first extension of the fireproof member is provided with a fixing bore for accommodating the fixing protrusion; or,
a lower surface of the first extension of the fireproof member is provided with a fixing protrusion extending in the vertical direction, and the top surface of the first end plate is provided with a fixing bore for accommodating the fixing protrusion.

In an embodiment of the present disclosure, the fireproof member includes a fireproof member body, a first extension and a second extension, wherein the first extension and the second extension are respectively connected to an upper end and a lower end of the fireproof member body, and both extend in a direction towards the first battery module, and the first extension and the second extension are respectively located on a top side and a bottom side of the first battery module having the plurality of battery cells.

In an embodiment of the present disclosure, the fireproof member further includes a third extension connected to the upper end of the fireproof member body and extending in a direction towards the second battery module; and/or
the fireproof member further includes a fourth extension connected to the lower end of the fireproof member body and extending in a direction towards the second battery module.

In an embodiment of the present disclosure, the fireproof member body, the first extension, the second extension, the third extension and the fourth extension are in an integrated structure.

In an embodiment of the present disclosure, the fireproof member is fixed to the first battery module and/or the second battery module by glue.

In an embodiment of the present disclosure, the housing comprises an upper housing cap and a lower housing body in a sealed form, and a bottom wall and/or a side wall of the lower housing body is provided with an accommodating slot for accommodating the fireproof member.

In an embodiment of the present disclosure, the fireproof member has a melting point greater than or equal to 500° C.

In an embodiment of the present disclosure, the fireproof member is made of mica.

Being distinguished from the existing technologies, the battery pack of the patent disclosure is provided with a special fireproof member which disposed as vertical, where both the vents of the first battery modules and the vents of the second battery modules facing the fireproof member (i.e., the vents being horizontal). In this way, the vents of the battery cells do not directly face a passenger over the battery pack. Therefore, when thermal runaway occurs to the battery cells, energy and flames released from the vents go towards the horizontal direction instead of the passenger, thereby improving safety for the passenger. Besides, the fireproof member is arranged between the vents of a first battery module and the vents of a second battery module, and thus separates the battery cells of the first battery module from the battery cells of the second battery module, thereby preventing any of the battery cells that has undergone thermal runaway from inducing thermal runaway of adjacent battery cells opposite to their vents.

LIST OF REFERENCE SIGNS

10. Battery pack
1. first battery module
11. battery cell
111. electrode assembly
1111. first electrode plate
1112. second electrode plate
1113. separator
1114. flat surface
112. case
1121. first surface
1122. second surface
113. electrode terminal connector
114. cap plate
115. electrode terminal
116. vent
12. first end plate
121. fixing protrusion
2. second battery module
21. second end plate
3. fireproof member
31. fireproof member body
311. first fireproof plate
312. second fireproof plate
32. first extension
321. fixing bore
33. second extension
34. third extension
35. fourth extension
4. upper housing cap
5. lower housing body 6. high temperature particle

DETAILED DESCRIPTION

Technical contents, structural features, objectives and effects of the present disclosure will be described in detail below with reference to the specific embodiments and the accompanying drawings.

In the description of the present disclosure, the terms "first" and "second" are used for descriptive purposes only, and are not to be construed as indicating or implying relative importance, unless otherwise specified and defined. The term "plurality" refers to two or more, unless otherwise specified and defined. The terms "connected" and "fixed", etc. should be perceived in a broad sense, for example, "connection" may either be a fixed connection, or a detachable connection, or an integral connection, or an electrical connection; it may be a directly connection, or an indirect connection through an intermediate medium. For ordinarily skilled persons in the art, the specific meanings of the above terms in the present disclosure may be perceived on a case-by-case basis.

In the description of the present disclosure, the direction indicated by an arrow x in all the drawings is a length direction, the direction indicated by an arrow y in all the drawings is a width direction, and the direction indicated by an arrow z in all the drawings is a vertical direction. A horizontal direction is a direction parallel to the horizontal plane, and may either be the above-described length direction or be the above-described width direction. In addition, a horizontal direction includes not only a direction that is absolutely parallel to the horizontal plane, but also a direction approximately parallel to the horizontal plane as is conventionally recognized in engineering. The vertical direction is a direction perpendicular to the horizontal plane, and the vertical direction includes not only the direction perpendicular to the horizontal plane, but also the direction approximately perpendicular to the horizontal plane as is conventionally recognized in engineering. In addition, description on such terms as "upper", "lower", "top", "bottom" and the like are perceived relative to the vertical direction.

Figure 1:
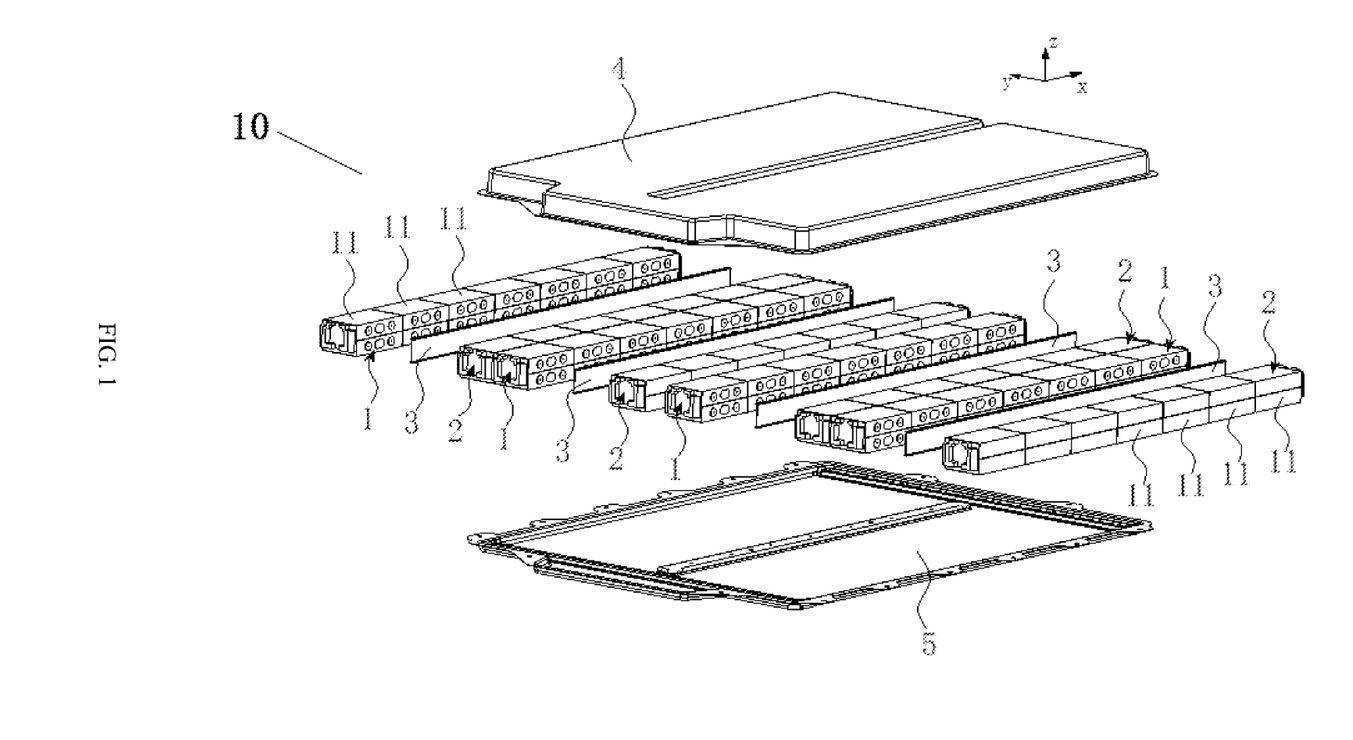
FIG. 1 shows an exploded view of a battery pack according to an embodiment of the present disclosure.
Figure 2:
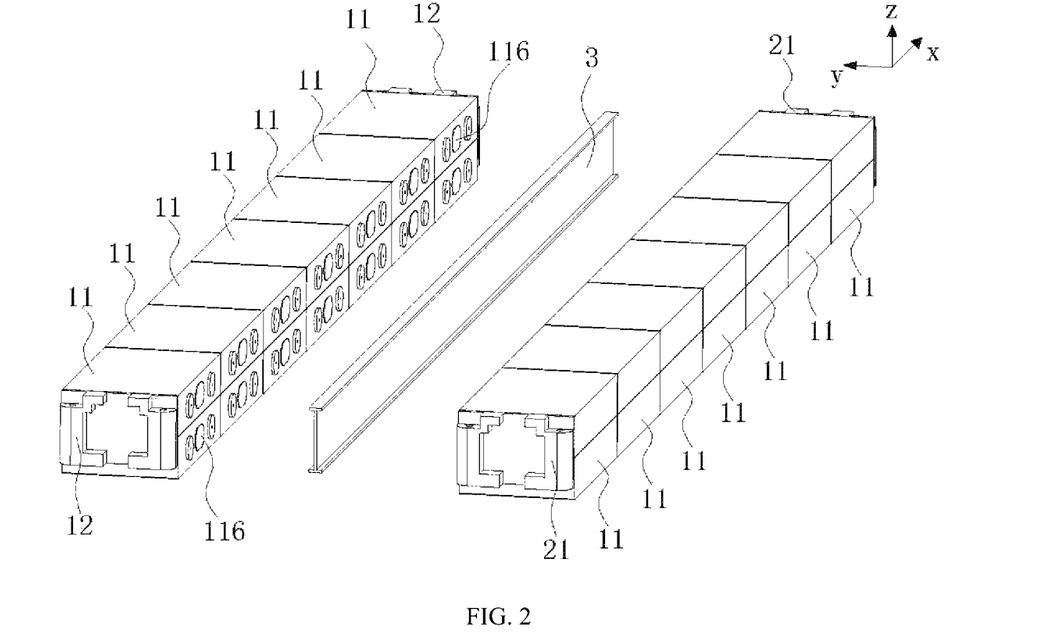
FIG. 2 shows a schematic structural view of a first battery module and a second battery module according to an embodiment of the present disclosure.

With reference to FIG. 1 and FIG. 2, an embodiment of the present disclosure relates to a battery pack, including a housing, a first battery module 1 and a second battery module 2 arranged in the housing. The battery pack may include a plurality of the first battery modules 1 and the second battery modules 2. Respectively, the first battery module 1 includes a plurality of battery cells 11 with each battery cell provided with a vent 116; the second battery module 2 includes a plurality of battery cells 11 with each battery cell provided with a vent 116. In the embodiment, four first battery modules 1 and four second battery modules 2 are taken as an example, but the number of the first battery modules 1 and second battery modules 2 are not limited thereto in practice.

Figure 3:
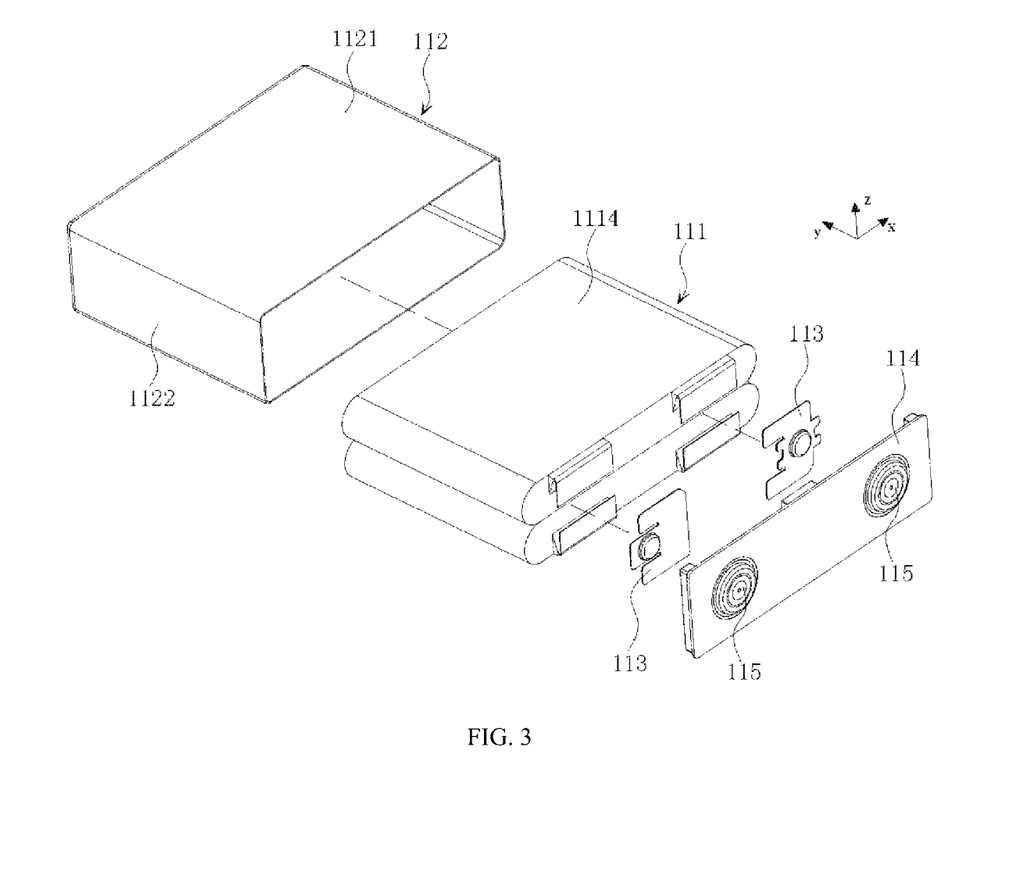
FIG. 3 shows an exploded view of a battery cell according to an embodiment of the present disclosure.

As shown in FIG. 3, the battery cell 11 includes an electrode assembly 111, a case 112, an electrode terminal connector 113, and a cap plate 114. The case 112 may be hexahedron-shaped or otherwise. The case 112 has an inner space accommodating the electrode assembly 111 and electrolyte, and the case 112 has an opening. The electrode assembly 111 is accommodated in the case 112, the cap plate 114 covers the opening and seals the electrode assembly 111 in the battery case 112. The cap plate 114 is provided with two electrode terminal 115, namely a positive electrode terminal and a negative electrode terminal, the electrode assembly 111 and the electrode terminal 115 are electrically connected by the electrode terminal connector 113. Here, accordingly there are two electrode terminal connectors 113, i.e., a positive electrode terminal connector and a negative electrode terminal connector. The case 112 may be made of a material such as aluminum, aluminum alloy or plastic, or the like.

The electrode assembly 111 is accommodated in the case 112. The electrode assembly 111 includes a first electrode plate 1111, a second electrode plate 1112, and a separator 1113 arranged between the first electrode plate 1111 and the second electrode plate 1112. The first electrode plate 1111 may be a positive electrode plate or a negative electrode plate, and the second electrode plate 1112 is opposite in polarity against the first electrode plate 1111, and correspondingly, the second electrode plate 1112 is a negative electrode plate or a positive electrode plate. The separator 1113 is an insulator between the first electrode plate 1111 and the second electrode plate 1112. The electrode assembly 111 may be a wound structure (as shown in FIG. 4) or a laminated structure (FIG. 5).

Illustratively, the first electrode plate 1111 being a positive electrode plate and the second electrode plate 1112 being a negative electrode plate are taken as examples for description. Similarly, in other embodiments, the first electrode plate 1111 may be a negative electrode plate, and correspondingly the second electrode plate 1112 is a positive electrode plate. Further, a positive electrode active material is applied onto a coated region of a positive electrode plate, and a negative electrode active material is applied onto a coated region of a negative electrode plate. The uncoated region extending from the coated zone acts as a tab. The electrode assembly 111 includes two tabs, namely a positive tab and a negative tab, where the positive tab extends from the coated region of the positive electrode plate and the negative tab extends from the coated region of the negative electrode plate. The positive tab and the positive electrode terminal are electrically connected through a positive connector, and the negative tab and the negative electrode terminal are electrically connected through a negative connector.

The case 112 is approximately a hexahedral structure and includes two first surfaces 1121 and two second surfaces 1122, the area of the first surfaces 1121 is larger than the area of the second surfaces 1122. In each battery cell 11 of the first battery module 1 and the second battery module 2, the two second surfaces 1122 of the case 112 are opposite to each other in the horizontal direction (for example, the length direction indicated by the arrow x), and the two first surfaces 1121 of the case 112 are opposite to each other in a vertical direction (for example, the direction indicated by the arrow z).

Figure 4:
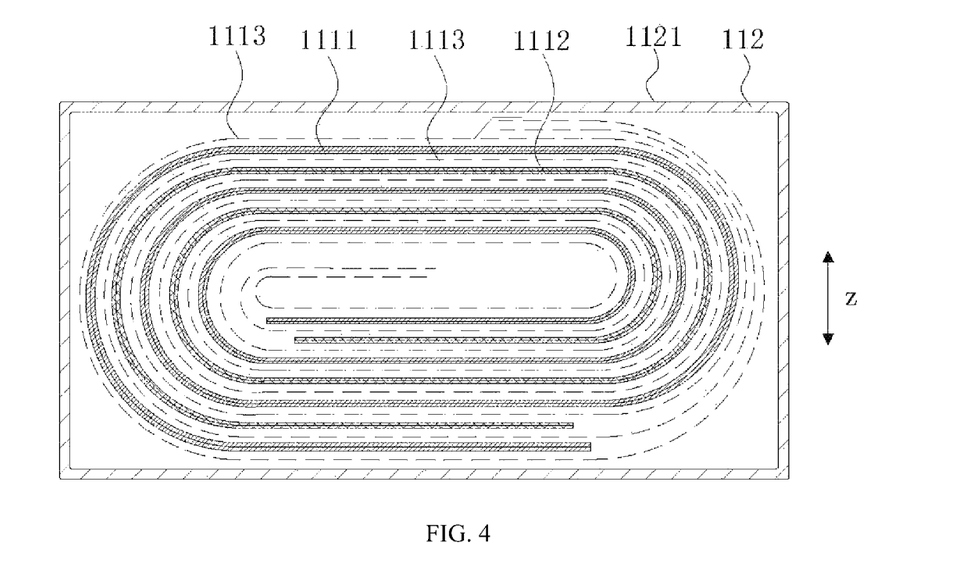
FIG. 4 shows a cross-sectional view showing an electrode assembly in a wound structure according to an embodiment of the present disclosure.
Figure 5:
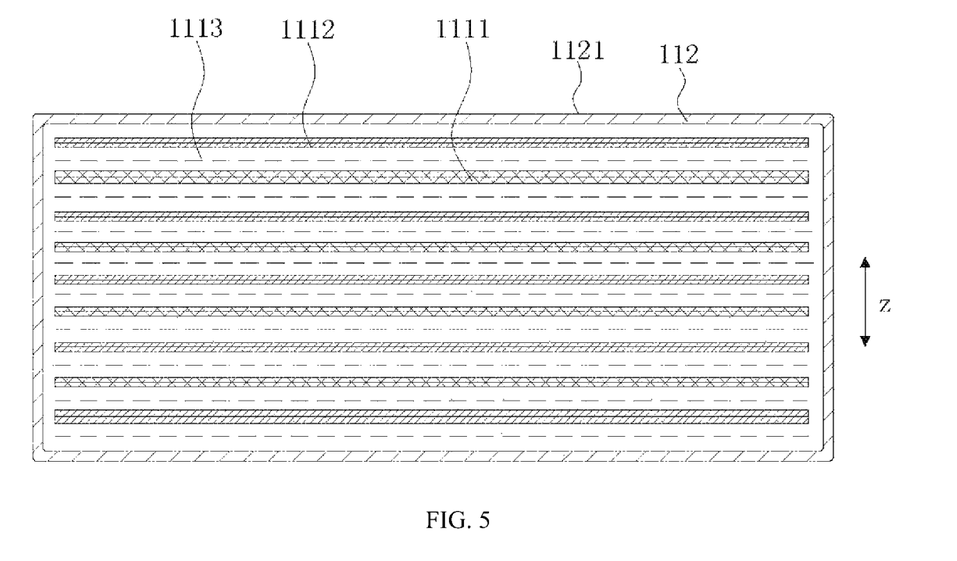
FIG. 5 shows a cross-sectional view of the electrode assembly in a laminated structure according to an embodiment of the present disclosure.

As shown in FIG. 4, when the electrode assembly 111 is a wound structure, the electrode assembly 111 is flat, and the outer surface of the electrode assembly 111 includes two flat surfaces 1114 that face each other in the vertical direction (the direction indicated by the arrow z), i.e., the flat surfaces 1114 face to the first surfaces 1121. The electrode assembly 111 is generally a hexahedral structure. Being the largest outer surface, the flat surfaces 1114 are generally parallel to the winding axis. The flat surfaces 1114 may be relatively flat but are not required to be absolutely flat.

As shown in FIG. 5, when the electrode assembly 111 is a laminated structure, the first electrode plate 1111, the separator 1113 and the second electrode plate 1112 are laminated in the vertical direction (the direction indicated by the arrow z), that is, the surface of the first electrode plate 1111 and the first surfaces 1121 face each other.

The electrode assembly 111 may swell in the thickness direction of the first electrode plate 1111 during charging and discharging (in the electrode assembly 111 of the wound structure, a swelling force is greatest in a direction perpendicular to the flat surfaces 1114; in the electrode assembly 111 of the laminated structure, the swelling force is greatest in a laminating direction of the first electrode plate 1111 and the second electrode plate 1112).

In an example, the electrode assembly 111 may be a wound structure or a laminated structure. When the electrode assembly 111 is a wound structure, the flat surfaces 1114 face towards a vertical direction (the direction indicated by the arrow z). When the electrode assembly 111 is a laminated structure, the first electrode plates 1111 and the second electrode plates 1112 are laminated in the vertical direction (the direction indicated by the arrow z). It is seen that the electrode assembly 111, whether being a wound structure or a laminated structure, applies the greatest swelling force to the case 112 always in the vertical direction.

However, in the existing technologies, for a battery cell 11 of the battery module 2, the greatest swelling force of the electrode assembly 111 to the case 112 is always in a horizontal direction. Since the dimension of the battery module 2 in the horizontal direction is much larger than the dimension in the vertical direction (for example, limited by the height of a car's chassis, more battery cells 11 are needed to be laminated in the horizontal direction, and the swelling force is accumulated, herein the vertical direction means the direction parallel to the height of the car), the existing battery module 2 bears an extremely great swelling force in the horizontal direction. Therefore, it is necessary to arrange two particularly thick end plates on both sides of the battery module 2 in the horizontal direction so as to resist the swelling force. However, an increased thickness to the end plates can decrease energy density of the battery module 2. In the present embodiment, the electrode assembly 111 applies the greatest swelling force to the case 112 in the vertical direction, and there are fewer battery cells 11 stacked in the vertical direction, thereby significantly decreasing the greatest swelling force of the battery module 2, as compared with the existing technologies.

In addition, since the battery cells 11 may generate gas inside the case 112 during charging and discharging, the generated gas may apply a force to the battery case 112, thereby aggravating outward swelling of the case 112. Since the area of the first surfaces 1121 of the present disclosure is larger than the area of the second surfaces 1122, and the two first surfaces 1121 of the case 112 face each other in the vertical direction, the generated gas has the maximum force applied to the case 112 in the vertical direction, which further decreases the greatest swelling force of the battery module 2, as compared with the existing technologies.

As shown in FIG. 2, in this embodiment, the battery pack further includes a fireproof member 3 vertically arranged (in the direction indicated by the arrow z as shown in FIG. 2), that is, the fireproof member 3 extends in the vertical direction. A vent 116 of the first battery module 1 and a vent 116 of the second battery module 2 both face the fireproof member 3, i.e., the fireproof member is located between the vent 116 of the first battery module 1 and the vent 116 of the second battery module 2. In this way, the vents 116 of the battery cells 11 of the first battery module 1 and the vents 116 of the battery cells 11 of the second battery module 2 are oriented in the horizontal direction (for example, the width direction indicated by the arrow y).

Further, the fireproof member 3 has a melting point greater than or equal to 500° C., so that flames will not melt the fireproof member 3, thereby having the fireproof function. Particularly, in this embodiment, since the fireproof member 3 is made of mica which has a high melting point (around 1723° C.), a requirement for fire-resistance by the fireproof member 3 is achieved; besides, a mica board has excellent processing properties. However, it is not limited to embodiment of a mica board.

In an embodiment of the present disclosure, the plurality of battery cells 11 of the first battery module 1 are arranged in the vertical direction (the direction indicated by the arrow z) and/or in the horizontal direction (e.g., the length direction indicated by the arrow x), and the plurality of battery cells 11 of the second battery module 2 are arranged in the vertical direction (the direction indicated by the arrow z) and/or in the horizontal direction (e.g., the length direction indicated by the arrow x). Specifically, the first battery module 1 and the second battery module 2 may have one to five battery cells 11 arranged in the vertical direction (the direction indicated by the arrow z), respectively. The first battery module 1 and the second battery module 2 may have five to twenty battery cells 11 arranged in the horizontal direction (e.g. the length direction indicated by the arrow x), respectively. In an example, the dimension of the first battery module 1 in the vertical direction (the direction indicated by the arrow z) is smaller than the dimension of the first battery module 1 in the length direction x. The dimension of the first battery module 1 in the vertical direction (the direction indicated by the arrow z) is smaller than the dimension of the first battery module 1 in the width direction y.

In an embodiment of the present disclosure, the first battery module 1 further includes two first end plates 12 which are respectively located at two ends of the plurality of battery cells 11 of the first battery module 1 in the horizontal direction. The first end plates 12 are used for fixing the plurality of battery cells 11 of the first battery module 1. Similarly, the second battery module 2 further includes two second end plates 21 which are respectively located at both ends of the plurality of battery cells 11 of the second battery module 2 in the horizontal direction (e.g., the length direction indicated by the arrow x). The second end plates 12 are used for fixing the plurality of battery cells 11 of the second battery module 1.

As shown in FIG. 2, in this embodiment, both the first battery module 1 and the second battery module 2 include seven battery cells 11 arranged in the length direction (the length direction indicated by the arrow x) and two rows of battery cells 11 arranged in the vertical direction (the direction indicated by the arrow z). The number, length, height, volume and the like of the battery cells 11 may be readjusted as needed.

Alternatively, the fireproof member 3 extends along the orientation of the battery cells 11, and the fireproof member 3 covers the vents 116 of all the battery cells 11. That is, the fireproof member 3 covers the vents 116 of all the battery cells 11 of the first battery module 1 and the vents 116 of all the battery cells 11 of the second battery module. With this design, it enables to prevent any of the battery cells 11 that has undergone thermal runaway from inducing thermal runaway of adjacent battery cells opposite to their vents 116.

In an embodiment of the present disclosure, the fireproof member 3 may be fixed to the first battery module 1 or the second battery module 2 by glue.

Figure 6:
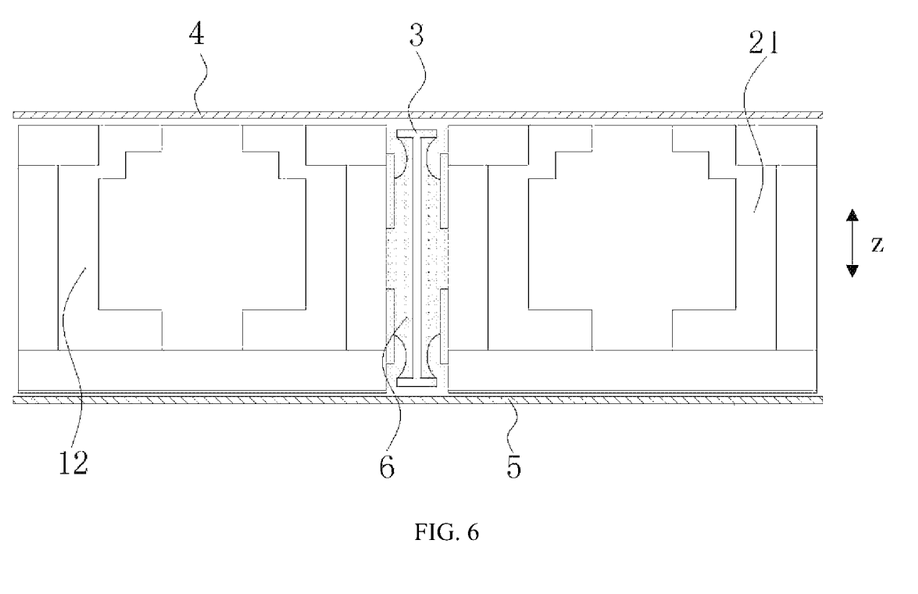
FIG. 6 shows a partial cross-sectional view of a battery pack according to an embodiment of the present disclosure.

As shown in FIG. 6, when thermal runaway occurs to a battery cell 11 (which may be a battery cell 11 of the first battery module 1 or a battery cell 11 of the second battery module 2), the vent 116 is broken and ejects flames and high temperature particles 6. At this time, since the fireproof member 3 is provided, both flames and high temperature particles 6 are blocked by the fireproof member 3, and the battery cells 11 of the first battery module 1 and the battery cells 11 of the second battery module 2 do not mutually affect each other, thereby a collective thermal runaway is prevented. In addition, since flames and high temperature particles 6 do not directly ejected upward, safety of the battery pack may be improved.

Figure 7:
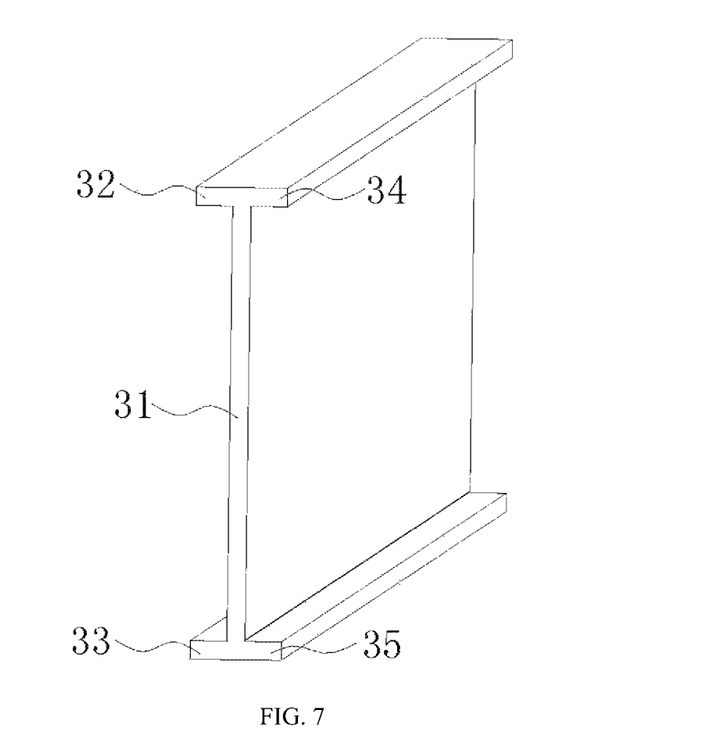
FIG. 7 shows a schematic structural view of a fireproof member according to an embodiment of the present disclosure.

Alternatively, the fireproof member 3 includes a fireproof member body 31 and a first extension 32 connected to an upper end of the fireproof member body 31, with the first extension 32 extending towards the first battery module 1; and/or, the fireproof member 3 includes a fireproof member body 31 and a second extension 33 connected to a lower end of the fireproof member 3, with the second extension 33 extending towards the first battery module 1. Since the first extension 32 is provided, it enables to block flames and high temperature particles 6 from being diffused upward, further improving safety of the battery pack. Since the second extension 33 is provided, it enables to block flames and high temperature particles 6 from being diffused downward, thereby further improving safety of the battery pack.

Alternatively, the fireproof member 3 further includes a third extension 34 which is connected to the upper end of the fireproof member body 31, and extends in a direction towards the second battery module 2; and/or the fireproof member 3 further includes a fourth extension 35 which is connected to the lower end of the fireproof member body 31, and extends in a direction towards the second battery module 2. Since the third extension 34 is arranged, flames and high temperature particles 6 may be blocked from being diffused upward, thereby further improving safety of the battery pack. Since the fourth extension 35 is arranged, flames and high temperature particles 6 may be blocked from being diffused downward, thereby further improving safety of the battery pack.

As shown in FIG. 7, in another example, the fireproof member 3 includes the fireproof member body 31, the first extension 32 and third extension 34 connected to the upper end of the fireproof member body 31, and the second extension 33 and fourth extension 35 connected to the lower end the fireproof member body 31.

Further, the first extension 32 and the second extension 33 respectively locate on top sides and bottom sides of the plurality of battery cells 11 of the first battery module 1, that is, a projection of the first extension 32 in the vertical direction overlaps at least partially a projection of the battery cells 11 in the vertical direction, and a projection of the second extension 33 in the vertical direction overlaps at least partially a projection of the battery cells 11 in the vertical direction. In other words, the first extension 32 overlaps at least partially the upper surface of the battery cells 11, and the second extension 33 overlaps at least partially the lower surface of the battery cells 11.

Further, the third extension 34 and the fourth extension 35 respectively locate on top sides and bottom sides of the plurality of battery cells 11 of the second battery module 2, that is, a projection of the third extension 34 in the vertical direction overlaps at least partially a projection of the battery cells 11 in the vertical direction, and a projection of the fourth extension 35 in the vertical direction overlaps at least partially a projection of the battery cells 11 in the vertical direction. In other words, the third extension 34 overlaps at least partially the upper surface of the battery cells 11, and fourth extension 35 overlaps at least partially the lower surface of the battery cells 11.

In this way, the vents 116 of the first battery module 1 and second battery module 2 may be covered in three directions at the same time by the first extension 32, the third extension 34, the second extension 33 and the fourth extension 35, thereby preventing flames and high temperature particles 6 from being ejecting upward or downward when thermal runaway occurs to the battery cells 11.

In an example, the fireproof member body 31, the first extension 32, the second extension 33, the third extension 34 and the fourth extension 35 are an integral structure. With this design, one fireproof member 3 may cover vents 116 of the first battery module 1 and vents of the second battery module 2, thereby reducing the number of the fireproof members 3 and installation difficulty.

Figure 8:
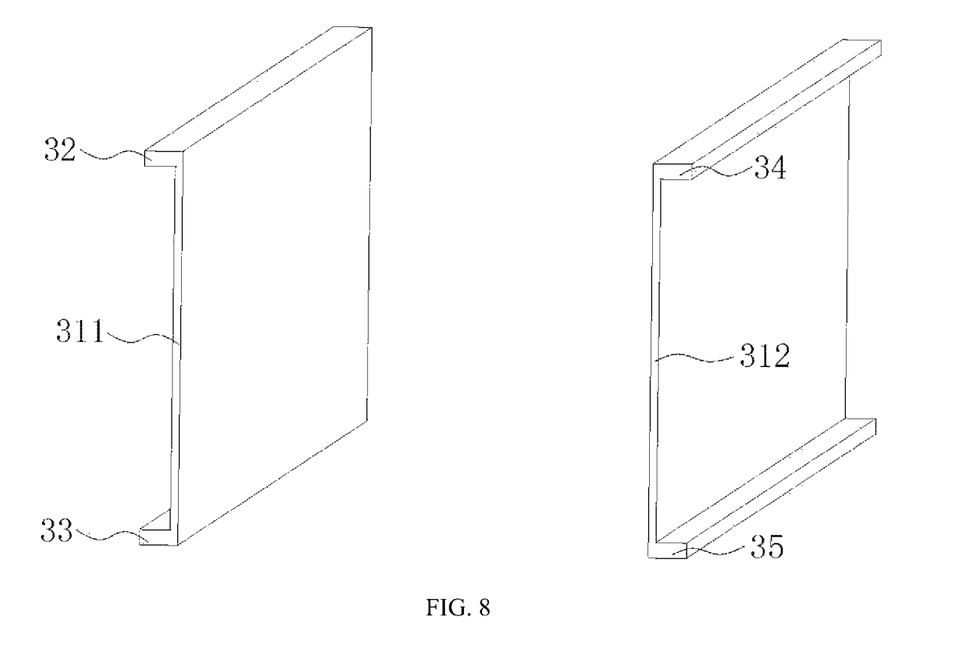
FIG. 8 shows a schematic structural view of a fireproof member according to another embodiment of the present disclosure.

In an example, as shown in FIG. 8, the fireproof member body 31 may include a first fireproof plate 311 and a second fireproof plate 312 which are separate from each other. The first fireproof plate 311 locates on a side of the second fireproof plate 312 facing the first battery module 1. The first extension 32 and the second extension 33 are respectively arranged at an upper end and lower end of the first fireproof plate 311. The first extension 32, the second extension 33 and the first fireproof plate 311 are an integrated structure. The third extension 34 and the fourth extension 35 are respectively arranged at an upper end and lower end of the second fireproof plate 312. The third extension 34, the fourth extension 35 and the second fireproof plate 312 are in an integrated structure.

However, it is necessary to indicate that there may be possibilities of any combinations among the first extension 32, the second extension 33, the third extension 34 and the fourth extension 35 of the fireproof member 3. Further, the pattern of the fireproof member 3 may be readjusted based on the above examples, so as to achieve the prime effect, that is, the fireproof member 3 is not limited to the pattern described in this embodiment.

Figure 9:
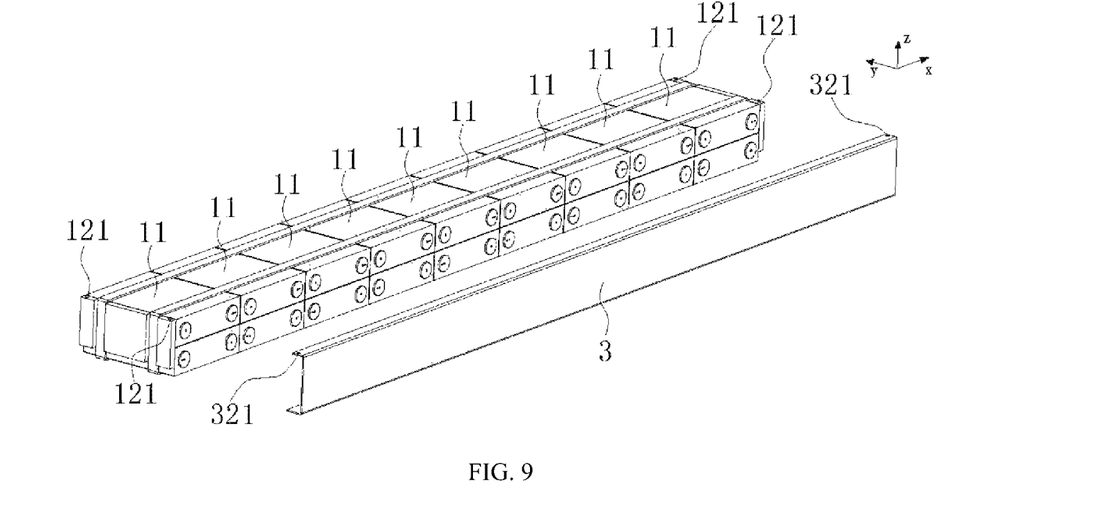
FIG. 9 shows an exploded view of the fireproof member and the first battery module according to an embodiment of the present disclosure.
Figure 10:
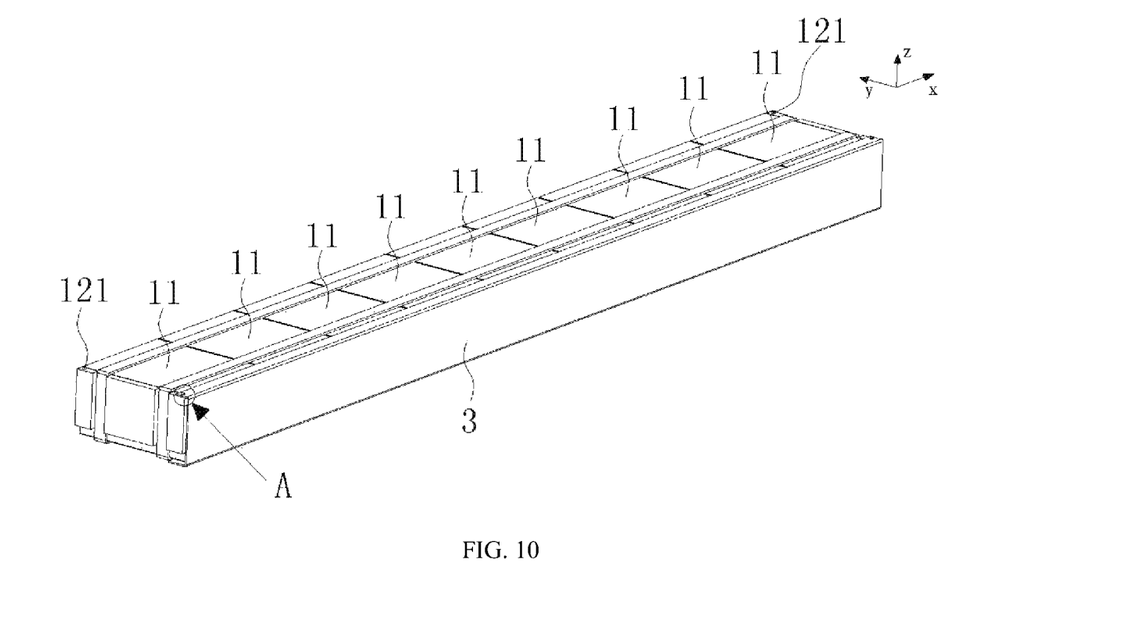
FIG. 10 shows a schematic view when the fireproof member is fixed to a first end plate according to an embodiment of the present disclosure.
Figure 11:
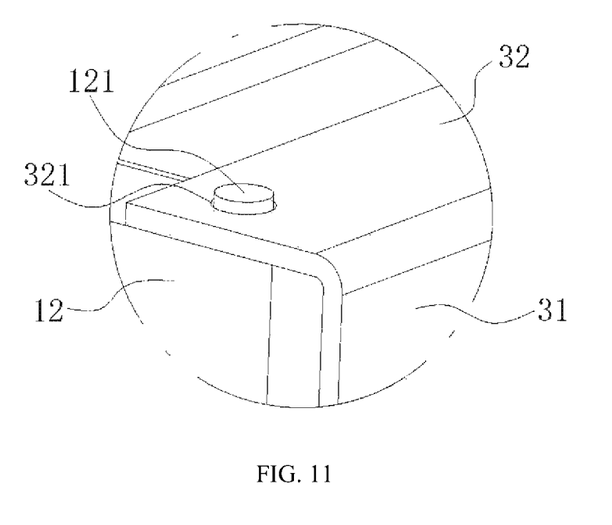
FIG. 11 shows an enlarged view at A of FIG. 10.

As shown in FIG. 9 to FIG. 11, in this embodiment, the first battery module 1 includes two first end plates 12 which locate at both ends of the plurality of battery cells 11 of the first battery module 1 in a horizontal direction, the first extension 32 and/or the second extension 33 of the fireproof member 3 are fixed with the first end plate 12.

In particular, in this embodiment, an upper end of the first end plate 12 is provided with a fixing protrusion 121 in the vertical direction, and the first extension 32 of the fireproof member 3 is provided with a fixing bore 321 for accommodating the fixing protrusion 121.

Alternatively, a lower surface of the first extension 32 of the fireproof member 3 is provided with a fixing protrusion 121 extending in the vertical direction, and the top end of the first end plate 12 is provided with a fixing bore 321 for accommodating the fixing protrusion 121. In this way, the fireproof member 3 is fixed to the first end plate 12 by matching the fixing protrusion 121 with the fixing bore 321, making both assembling and disassembling easy and convenient.

In an embodiment of the present disclosure, the housing comprises an upper housing cap 4 and a lower housing body 5 which are sealed to each other. A side wall or a bottom wall of the lower housing body 5 is provided with an accommodating slot for accommodating the fireproof member 3. In this way, the fireproof member 3 may be fixed well by the accommodating slot.

In an assembling process, a plurality of battery cells 11 are arranged in the horizontal direction (the direction indicated by the arrow x) and vertical direction (the direction indicated by the arrow z), two end plates are located on both ends of an arrangement of the plurality of battery cells 11 in the horizontal direction (the direction indicted by the arrow x), so as to form a battery module; and a plurality of battery modules are arranged within a housing, in which all the vents 116 of the battery modules face the same fireproof member 3.

It shall be noted that although the above embodiments have been described herein, the protection scope of the invention is not limited hereby. Therefore, based on the innovative concept of the present disclosure, changes and modifications performed on the embodiments herein, changes to equivalent structures and processes in accordance with the specification and the drawings of the present disclosure, direct and indirect application of the above-described technical solutions in other related technical fields are all included in the protection scope of the present disclosure.

What is claimed is:

1. A battery pack, comprising:
   a first battery module, comprising a plurality of battery cells, wherein each of the plurality of battery cells of the first battery module is provided with a vent;
   a second battery module, comprising a plurality of battery cells, wherein each of the plurality of battery cells of the second battery module is provided with a vent;
   a housing, for housing both the first battery module and the second battery module; and
   a fireproof member, vertically arranged and located between the vent of the first battery module and the vent of the second battery module, wherein the vent of the first battery module and the vent of the second battery module face the fireproof member.

2. The battery pack according to claim 1, wherein the plurality of battery cells of the first battery module are arranged in a vertical direction and/or a horizontal direction, and the plurality of battery cells of the second battery module are arranged in a vertical direction and/or a horizontal direction.

3. The battery pack according to claim 2, wherein the fireproof member extends along an arrangement direction of the battery cells, and covers the vents of the first battery module and the vents of the second battery module.

4. The battery pack according to claim 1, wherein the fireproof member comprises a fireproof member body and a first extension connected to an upper end of the fireproof member body and the first extension extends in a direction towards the first battery module; and/or,
   the fireproof member comprises a fireproof member body and a second extension connected to a lower end of the fireproof member and the second extension extends in a direction towards the first battery module.

5. The battery pack according to claim 4, wherein the first battery module further comprises two first end plates, and the two first end plates are respectively located at two ends of the first battery module having the plurality of battery cells in a horizontal direction, and the first extension and/or second extension of the fireproof member is fixed to the first end plate.

6. The battery pack according to claim 5, wherein a top surface of the first end plate is provided with a fixing protrusion extending in the vertical direction, the first extension of the fireproof member is provided with a fixing bore for accommodating the fixing protrusion; or
   a lower surface of the first extension of the fireproof member is provided with a fixing protrusion extending in the vertical direction, and the top surface of the first end plate is provided with a fixing bore for accommodating the fixing protrusion.

7. The battery pack according to claim 1, wherein the fireproof member comprises a fireproof member body, a first extension and a second extension, wherein the first extension and the second extension are respectively connected to an upper end and a lower end of the fireproof member body, and both extend in a direction towards the first battery module; and the first extension and the second extension are respectively located on a top side and a bottom side of the first battery module having the plurality of battery cells.

8. The battery pack according to claim 4, wherein the fireproof member further comprises a third extension connected to the upper end of the fireproof member body and extending in a direction towards the second battery module; and/or the fireproof member further comprises a fourth extension connected to the lower end of the fireproof member body and extending in a direction towards the second battery module.

9. The battery pack according to claim 8, wherein the fireproof member body, the first extension, the second extension, the third extension and the fourth extension are in an integrated structure.

10. The battery pack according to claim 1, wherein the fireproof member is fixed to the first battery module and/or the second battery module by glue.

11. The battery pack according to claim 1, wherein the housing comprises an upper housing cap and a lower housing body in a sealed form; a bottom wall and/or a side wall of the lower housing body is provided with an accommodating slot for accommodating the fireproof member.

12. The battery pack according to claim 1, wherein the fireproof member has a melting point greater than or equal to 500° C.

13. The battery pack according to claim 12, wherein the fireproof member is made of mica.

* * * * *